US007440025B2

(12) United States Patent
Cheng

(10) Patent No.: US 7,440,025 B2
(45) Date of Patent: Oct. 21, 2008

(54) DEFOGGING DEVICE FOR A SURVEILLANCE CAMERA

(76) Inventor: Yi-Jen Cheng, 9F, No. 21, Sec. 2, Chorngder 2 Rd., Taichung (TW)

( * ) Notice: Subject to any disclaimer, the term of this patent is extended or adjusted under 35 U.S.C. 154(b) by 533 days.

(21) Appl. No.: 11/272,777

(22) Filed: Nov. 15, 2005

(65) Prior Publication Data

US 2007/0109441 A1 May 17, 2007

(51) Int. Cl.
*H04N 5/225* (2006.01)

(52) U.S. Cl. ........................ 348/373; 348/143; 348/122; 348/375; 348/207.99; 396/427; 386/118

(58) Field of Classification Search ................. 348/375, 348/143, 207.99, 373, 122; 386/118; 396/427
See application file for complete search history.

(56) References Cited

U.S. PATENT DOCUMENTS

2003/0021602 A1* 1/2003 Ford ........................... 396/427
2006/0171704 A1* 8/2006 Bingle et al. ................ 396/419

* cited by examiner

*Primary Examiner*—David Ometz
*Assistant Examiner*—Usman Khan
(74) *Attorney, Agent, or Firm*—Rabin & Berdo, P.C.

(57) ABSTRACT

A defogging device for a surveillance camera has a heating element, a circuit board and a power cord. The heating element is mounted over the lens of the surveillance camera. The circuit board compares ambient temperature to a preset temperature, activates the heating element and has a power input terminal, a power output terminal and a temperature sensor. The temperature sensor is mounted between the power input terminal and the power output terminal and senses ambient temperature. When the ambient temperature is above the preset temperature, the circuit board activates the heating element. The power cord is connected to the circuit board and the heating element and transmits power to the heating element from the circuit board. By activating the heating element during periods of cold ambient temperature, the defogging device removes fog and frost from or keeps fog and frost from forming on the lens of the surveillance camera.

1 Claim, 4 Drawing Sheets

DEFOGGING DEVICE FOR A SURVEILLANCE CAMERA

BACKGROUND OF THE INVENTION

1. Field of the Invention

The present invention relates to a defogging device, and more particularly to a defogging device for a surveillance camera.

2. Description of Related Art

Conventional surveillance cameras are widely used. To protect the camera lens and keep the camera lens from getting dirty, lenses are often mounted inside surveillance camera cases. Therefore the influence of the external environment on the lens are reduced or eliminated.

However, the conventional surveillance camera has the following shortcomings.

1. In countries in the temperate zone of the earth, fog or frost on the lens or lens cover on the case of the surveillance camera during periods of lower temperature.

2. The fog or frost keeps the camera lens from obtaining a clear image through the lens or lens cover on the case and reduces the effectiveness of the surveillance camera.

The defogging device for a surveillance camera in accordance with the present invention mitigates or obviates the aforementioned problems.

SUMMARY OF THE INVENTION

The main objective of the present invention is to provide a defogging device to remove fog or frost from a lens of a surveillance camera or keep fog or frost from forming on the lens.

The defogging device has a heating device, a circuit board and a power cord. The heating device is mounted over the lens of the surveillance camera. The circuit board compares ambient temperature to a preset temperature, activates the heating device and has a power input terminal, a power output terminal and a temperature sensor. The temperature sensor is mounted between the power input terminal and the power output terminal and senses ambient temperature. When the ambient temperature is below the preset temperature, the circuit board activates the heating device. The power cord is connected to the circuit board and the heating device and transmits power to the heating element from the circuit board. By activating the heating element during periods of cold ambient temperature, the defogging device removes fog and frost from or keeps fog and frost from forming on the lens of the surveillance camera.

Other objectives, advantages and novel features of the invention will become more apparent from the following detailed description when taken in conjunction with the accompanying drawings.

.

DETAILED DESCRIPTION OF THE PREFERRED EMBODIMENT

Figure 1:
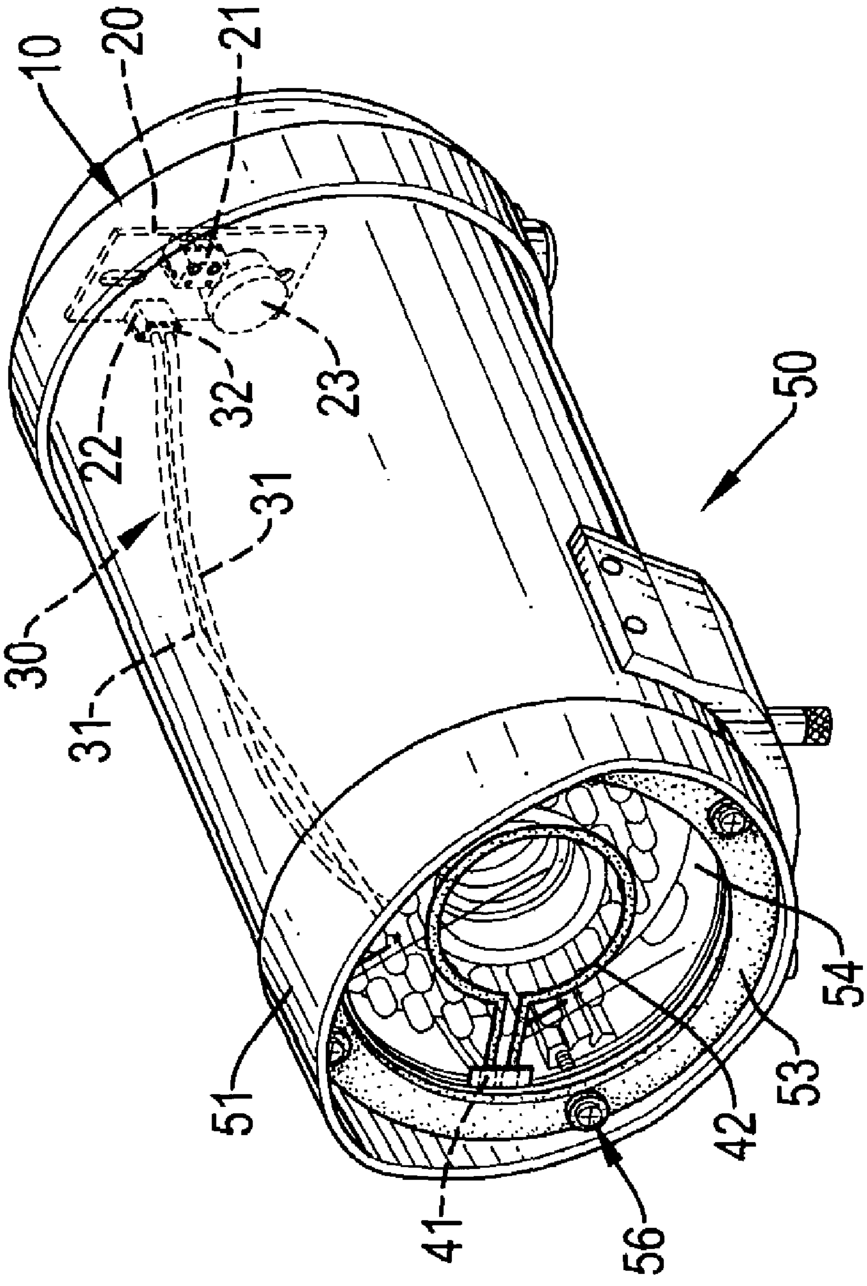
FIG. 1 is a perspective view of a defogging device for a surveillance camera in accordance with the present invention.

With reference to FIG. 1, a defogging device (10) in accordance with the present invention for a surveillance camera removes fog or frost from a lens of the surveillance camera.

Figure 2:
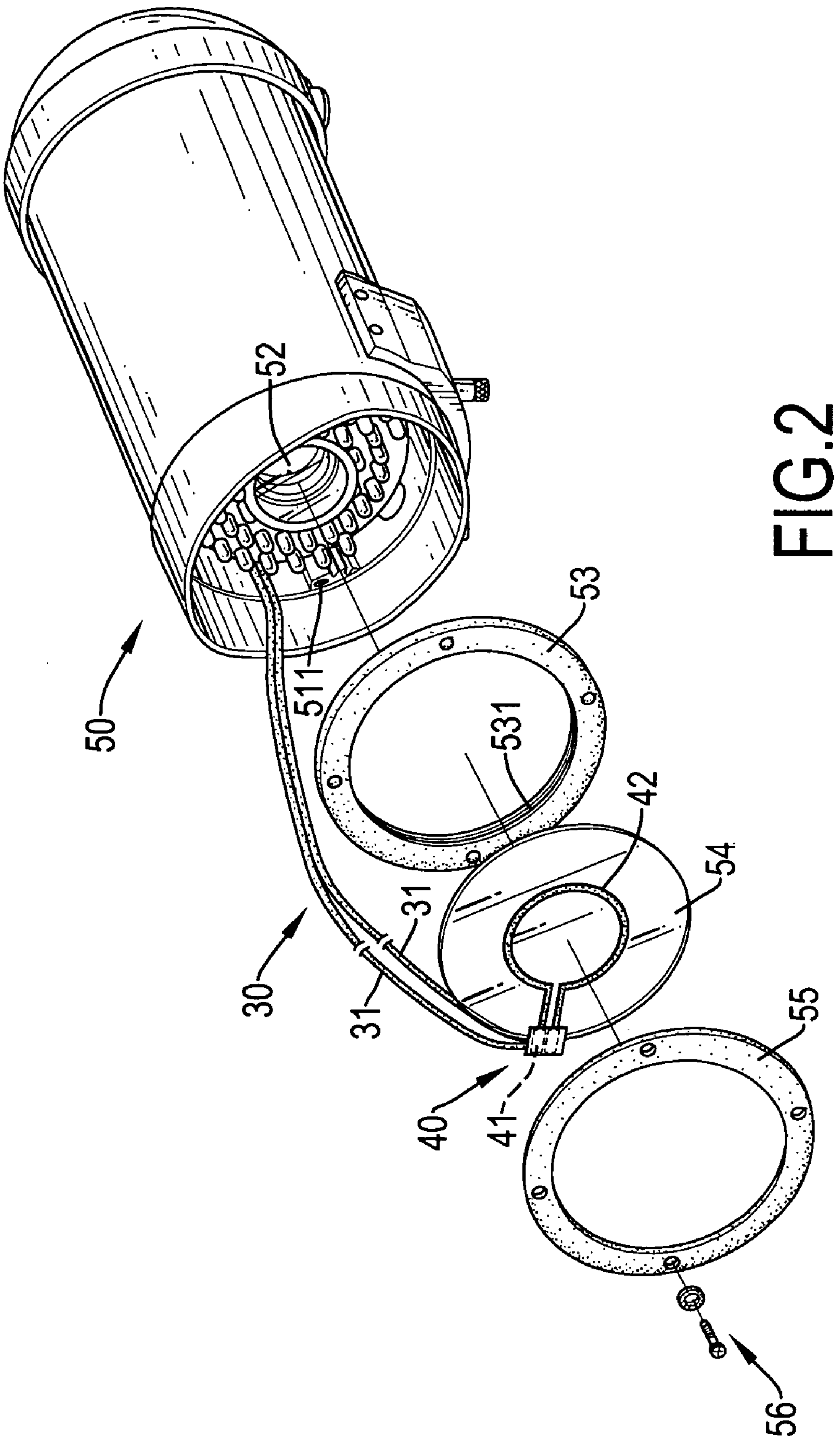
FIG. 2 is an exploded perspective view of part of the defogging device in FIG. 1.

With further reference to FIG. 2, the surveillance camera (50) having a case (51), a camera (52), a washer (53), a lens cover (54), a retaining ring (55) and multiple fasteners (56).

The case (51) has a front end, an inner cavity, an inner surface and multiple threaded seats (511). The threaded seats (511) are formed on and protrude in from the inner surface near the front end of the case (51) and each threaded seat (511) has a threaded hole facing the front end.

The camera (52) is mounted in the inner cavity of the case (51) and has a lens, a camera mechanism and a power source.

The washer (53) is mounted in the front end of the case (51) against the threaded seats (511) and has an inside surface and an annular groove (531). The annular groove (531) is formed in the inside surface of the washer (53).

The lens cover (54) is mounted in the annular groove (531) in the washer (53) and has an exterior surface, a center and an outer edge.

The retaining ring (55) is mounted against the lens cover (54) and holds the washer (53) and the lens cover (54) in the front end of the case (51).

The fasteners (56) extend through the washer (53) and the retaining ring (55) and into the threaded seats (511) to hold the lens cover (54) in the front end of the case (51).

Figure 3:
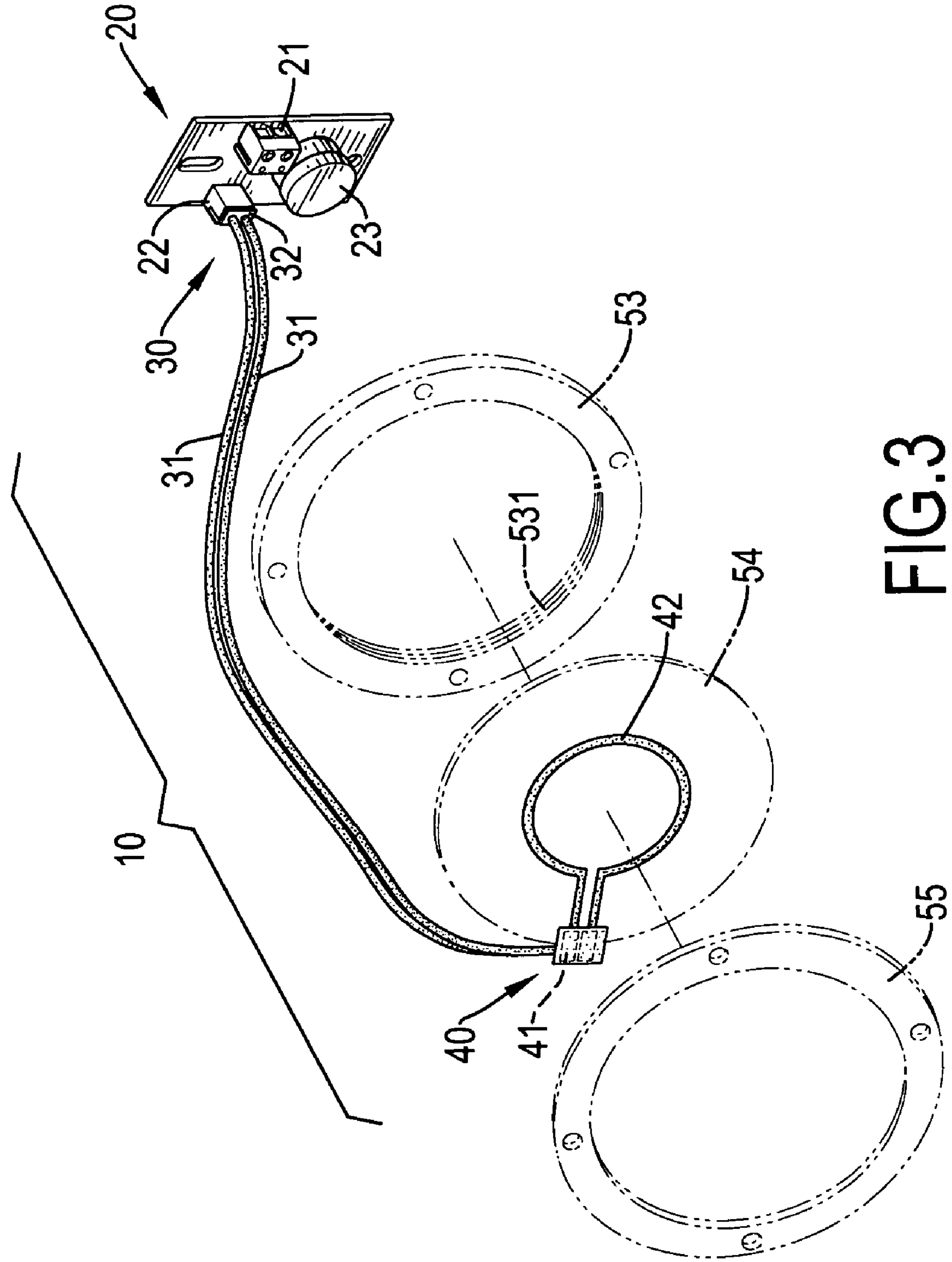
FIG. 3 is an exploded perspective view of the defogging device in FIG. 1.

With further reference to FIG. 3, the defogging device (10) comprises a heating device (40), a circuit board (20) and a power cord (30).

The heating device (40) is mounted on the lens cover (54) concentrically with the camera lens, melts frost and dissipates moisture on the lens cover (54) and has a heating element (42) and two contacts (41). The heating element (42) is mounted concentrically on the lens cover (54) near the outer edge has two ends. The contacts (41) are attached respectively to the ends of the heating element (42) at the outer edge of the lens cover (54).

The circuit board (20) compares ambient temperature to a preset temperature, activates the heating device (40) and has a power input terminal (21), a power output terminal (22) and a temperature sensor (23). The temperature sensor (23) is mounted between the power input terminal (21) and the power output terminal (22) and senses ambient temperature. When the ambient temperature is below the preset temperature, the circuit board (20) activates the heating device (40).

The power cord (30) is connected to the circuit board (20) and the heating device (40) and comprises an electrical cord (31) and a plug (32). The electrical cord (31) has a proximal end and a distal end. The distal end is connected securely to the terminals (41) of the heating device (40). The plug (32) is connected to the proximal end of the electrical cord (31) and is connected to the power output terminal (22) on the circuit board (20).

According to the above, with reference to FIGS. 2 and 3, to assembled the defogging device (10) with the case (51) of the surveillance camera (50), the heat heating element (42) is mounted concentrically on the lens cover (54) near the outer edge. Then, the heat element (42) is mounted in the center of the lens (54). The contacts (41) are attached respectively to the ends of the heating element (42) at the outer edge of the lens cover (54). Then the power cord (30) is connected to the circuit board (20) and the heating device (40). The distal end of the electrical cord (31) is connected securely to the terminals (41) of the heating device (40) to achieve the defogging device (10) with the surveillance camera (50) as shown in FIG. 1.

Figure 4:
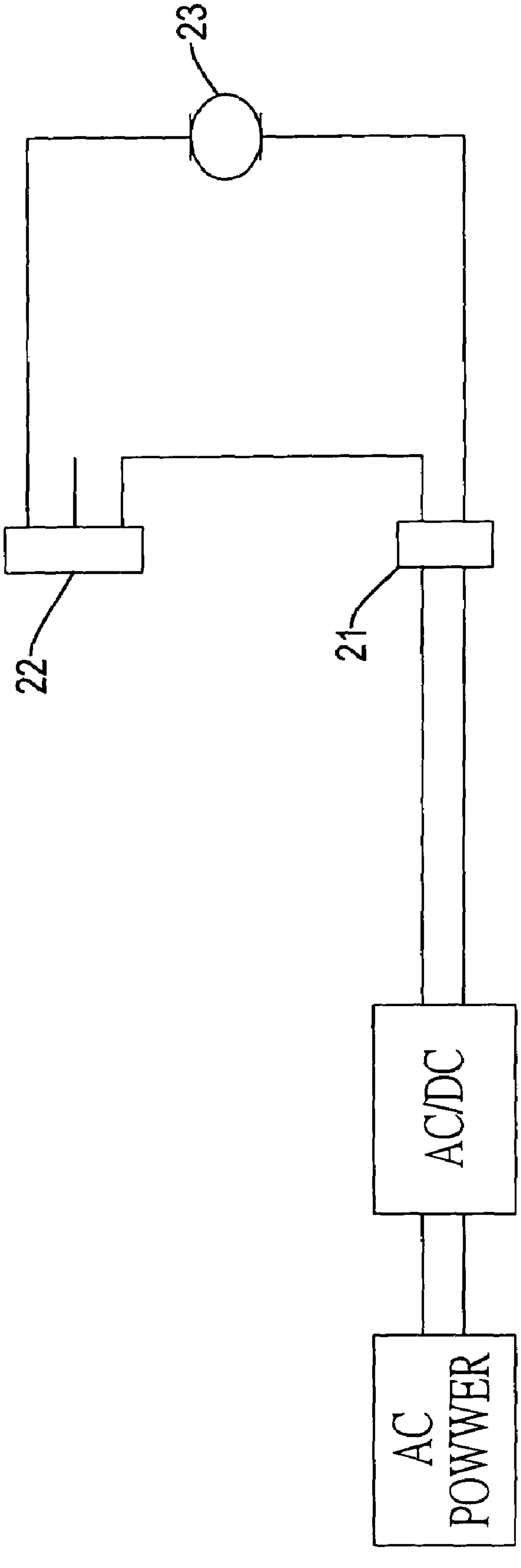
FIG. 4 is a simplified block diagram of a circuit board in the defogging device in FIG. 1

In use, with reference to FIG. 4, he temperature sensor (23) is mounted between the power input terminal (21) and the power output terminal (22) and senses ambient temperature. When the ambient temperature is below the preset temperature, the circuit board (20) activates the heating device (40).

The defogging device (10) as described has the following advantages.

1. The heating device (40) of the defogging device (10) is mounted on the lens cover (54) of the surveillance camera (50) concentrically with the camera lens. Therefore the defogging device (10) will not interfere with objects in the field of view of the camera lens.

2. The heating element (42) is mounted concentrically on the lens cover (54) near the outer edge, which allow even distribution of heat to get rid of fog or frost.

3. The temperature sensor allows the defogging device (10) to be activated at any preset temperature and does not restrict activation of the defogging device (10) to a single temperature so surveillance cameras (50) with a defogging device (10) can be used in widely varying environments.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A defogging device for a surveillance camera having a case with a front end, an inner cavity, an inner surface and multiple threaded seats formed on and protruding in from the inner surface near the front end of the case, and each threaded seat having a threaded hole facing the front end; a surveillance camera mounted in the inner cavity of the case and having a lens, a camera mechanism and a power source; a washer mounted in the front end of the case against the threaded seats and has an inside surface and an annular groove formed in the inside surface of the washer; a lens cover mounted in the annular groove in the washer and having an exterior surface, a center and an outer edge; a retaining ring mounted against the lens cover and holding the washer and the lens cover in the front end of the case; and multiple fasteners through the washer and the retaining ring and into the threaded seats to hold the lens cover in the front end of the case, and the defogging device comprising a heating device adapted to be mounted on the lens cover concentrically with the camera lens and to melt frost and dissipating moisture on the lens cover and having a heating element adapted to be mounted concentrically on the lens cover near the outer edge; and two contacts attached respectively to the ends of the heating element and adapted to be located at the outer edge of the lens cover;

a circuit board for comparing ambient temperature to a preset temperature and activating the heating device and that has a power input terminal;

a power output terminal; and a temperature sensor mounted between the power input terminal and the power output terminal to compare ambient temperature to a preset temperature and activate the heating device; and a power cord connected to the circuit board and the heating device and comprising an electrical cord having a proximal end; and a distal end connected securely to the terminals of the heating device; and a plug connected to the proximal end of the electrical cord and connected to the power output terminal of the circuit board.

* * * * *